United States Patent [19]

von Bonin et al.

[11] Patent Number: 4,529,742
[45] Date of Patent: Jul. 16, 1985

[54] OPTIONALLY FOAMED INTUMESCENT MASSES PREPARED FROM POLYISOCYANATES, HYDROXYL COMPOUNDS AND MELAMINE PHOSPHATES

[75] Inventors: Wulf von Bonin, Leverkusen; Friedrich Jonas, Aachen, both of Fed. Rep. of Germany

[73] Assignee: Bayer Aktiengesellschaft, Bayerwerk, Fed. Rep. of Germany

[21] Appl. No.: 578,452

[22] Filed: Feb. 9, 1984

[30] Foreign Application Priority Data

Feb. 25, 1983 [DE] Fed. Rep. of Germany ....... 3306698

[51] Int. Cl.$^3$ .............................................. C08G 18/14
[52] U.S. Cl. .................................... 521/107; 521/108; 521/165; 523/179; 528/51; 528/73
[58] Field of Search ....................... 521/107, 108, 165; 523/179; 528/51, 73

[56] References Cited

U.S. PATENT DOCUMENTS

| | | | |
|---|---|---|---|
| 3,396,129 | 8/1968 | Yeadon et al. | 260/22 |
| 3,914,513 | 10/1975 | Brown et al. | 524/411 |
| 4,003,861 | 1/1977 | Savides et al. | 260/2.5 AJ |
| 4,198,328 | 4/1980 | Bertelli et al. | 523/179 |
| 4,258,141 | 3/1981 | Jarre et al. | 521/114 |
| 4,367,295 | 1/1983 | von Bonin | 521/165 |
| 4,374,207 | 2/1983 | Stone et al. | 521/107 |
| 4,380,593 | 4/1983 | von Bonin et al. | 521/163 |

FOREIGN PATENT DOCUMENTS 3025217  3/1982  Fed. Rep. of Germany.

Primary Examiner—Maurice J. Welsh
Attorney, Agent, or Firm—Gene Harsh; Joseph C. Gil; Thomas W. Roy

[57] ABSTRACT

The present invention relates to optionally foamed intumescent masses obtained by reacting
  (1) polyisocyanates with a mixture containing
  (2) polyethers having an average OH number of from about 150 to 500 and obtained by the chemical addition of alkylene oxides having an ethylene oxide content of from about 50 to 100% by weight to low molecular weight starters, and/or
  (3) hydroxyl polyesters having an OH number of from about 100 to 350 obtained by the reaction of aliphatic, cycloaliphatic, araliphatic and aromatic polycarboxylic acids having 2 to 10 carbon atoms with at least two polyols selected from two different groups of the three following groups:
    (a) hydroxyl compounds with a molecular weight of up to about 200 having more than three OH groups,
    (b) hydroxyl groups with a molecular weight of up to about 150 having three OH groups, and
    (c) hydroxyl compounds with a molecular weight of up to about 80 having two OH groups, wherein one of the polyols belongs to group (a), and
  (4) a phosphate of the melamine phosphate type.

The invention additionally relates to the use of the intumescent masses for preparing moulded articles or devices for preventive fire protection.

12 Claims, No Drawings

OPTIONALLY FOAMED INTUMESCENT MASSES PREPARED FROM POLYISOCYANATES, HYDROXYL COMPOUNDS AND MELAMINE PHOSPHATES

BACKGROUND OF THE INVENTION

1. Field of the Invention

This invention relates to optionally foamed intumescent masses based on polyurethanes containing, as a component of their formulation, a combination of specific polyethers and/or polyesters and phosphates of the melamine phosphate type and having a plastic-elastic character.

2. Description of the Prior Art

Intumescent masses are materials which foam up in the presence of fire and heat to form an insulating and fire repellent foam which protects the regions behind it from the effect of fire. Such intumescent masses are known in the form of lacquers, coatings, mortars and putties.

Good intumescent masses should be able to at least double their volume in contact with fire and should be water resistant. It is of particular technical interest to be able to obtain these properties in the absence of halogens and in combination with a low unit weight, i.e. a certain insulating effect in the unstressed state, as well as plasticity, flexibility and/or elasticity.

Elastic-plastic intumescent masses with good dimensional stability would have numerous applications in the field of preventive fire protection both when used in situ and in the form of semi-finished products such as bands, pates, wrappings, profiles, coatings, granulates or fillings such as puddling compositions.

The use of melamine in the manufacture of flexible foams from substantially linear polyols, in particular polyether polyols, is already known in principle (DE-OS 2,815,554). Although these foams are flame resistant and do not burn down completely when exposed to flames, they by no means have the character of intumescent masses and are not found to undergo an increase in volume to form a fire repellent foam when exposed to flames.

According to an earlier proposal (German patent application P 30 25 217.6), flame resistant sealing compounds free from phosphorus and halogen can be prepared using branched polyesters containing hydroxyl groups. These sealing compounds also do not have an intumescent character, that is to say they do not foam up on exposure to fire.

Optionally foamed intumescent masses have also been disclosed in DE-OS 3,041,731 and DE-OS 3,109,352.

Even though such optionally foamed intumescent masses have the desired characteristics to a sufficient degree, it still would be desirable to be able to replace these phosphorus-containing condensation products by more readily available or less water soluble phosphorus-containing compounds. It would be even more desirable to find a material capable of combining the role of a cyanuric acid derivative having the nature of a filler with that of a phosphorus-containing condensation product.

It has now surprisingly been found that it is possible to obtain optionally flexible intumescent masses which do not require the complicated structure of phosphorus-containing condensation products and wherein the cyanuric acid derivatives may be replaced. This means that a substantially simpler formulation may be used since the new intumescent masses can be obtained from a minimum of only three components instead of the four which were hitherto essential.

This is achieved by using readily available and less water soluble phosphates of the melamine phosphate type instead of the cyanuric acid derivative and the phosphorus-containing condensation product. It is now no longer necessary to use these two components which have been replaced although they may, of course, also be used since the additional use of these components may possibly provide advantages in the fire characteristics and capacity for intumescence.

SUMMARY OF THE INVENTION

The present invention thus relates to optionally foamed intumescent masses obtained by reacting
(1) polyisocyanates with a mixture comprising
(2) polyethers having an average OH number of from about 150 to 500 and obtained by the chemical addition of alkylene oxides having an ethylene oxide content of from about 50 to 100% by weight, to low molecular weight starters, and/or
(3) hydroxyl polyesters having an OH number of from about 100 to 350 obtained by the reaction of aliphatic, cycloaliphatic, araliphatic and aromatic polycarboxylic acids having from 2 to 10 carbon atoms with at least two polyols selected from two different groups of the three following groups:
 (a) hydroxyl compounds with a molecular weight of up to about 200 having more than three OH groups,
 (b) hydroxyl groups with a molecular weight of up to about 150 having three OH groups, and
 (c) hydroxyl compounds with a molecular weight of up to about 80 having two OH groups, wherein one of the polyols belongs to group (a), and
(4) phosphates of the melamine phosphate type.
It is also possible to optionally add water
(5) and/or other compounds containing isocyanate-reactive hydrogen atoms (6).

The invention additionally relates to the use of the new intumescent masses for filling cavities, sealing joints and forming coatings with intumescent properties. The invention further relates to the use of the intumescent masses obtained by a reaction in moulds or by subsequent shaping of the completely reacted mixtures for the production of moulded articles or devices having intumescent properties or their use in powder form.

DETAILED DESCRIPTION OF THE INVENTION

According to the invention, it is preferred to use intumescent masses which have been obtained by the reaction of from about 10 to 70 parts by weight of a polyisocyanate (1) with 100 parts by weight of a mixture containing about 20 to 80% by weight of the above mentioned polyether and/or polyester (2,3) and about 15 to 75% by weight of phosphates of the melamine phosphate type (4) and 0 to 10% by weight of water (5) and/or 0 to 35% by weight of other organic compounds containing isocyanate reactive hydrogen atoms (6).

Particularly preferred are those intumescent masses which are characterized in that the polyisocyanates used are polyphenylene polymethyl polyisocyanates obtainable by aniline-formaldehyde condensation followed by phosgenation (MDI) and those intumescent masses containing phosphates of the melamine phosphate type which are reaction products of about 0.2 to 1 mol orthophosphoric acid per mol of melamine.

The intumescent masses obtained according to the invention may be flexible and may be foamed. In the case of the foamed masses, it has surprisingly been found that they may have the character of water resistant, plastic-elastic foamed masses, which means that they may easily be compressed and then recover only slowly to resume their original form. This unexpected behavior is technically particularly advantageous, for example when the intumescent masses are used in the form of prefinished bands, U-shaped sections or other shaped elements which can easily be introduced into joints or cavities where they subsequently expand so that they completely fill up all the irregularities to seal the gap or space.

Plastic-elastic, water resistant intumescent masses such as are obtained according to the invention are of particular technical interest because the pre-forms obtained from them can be pushed particularly easily into joints or cavities and because they may also be used as wrappings around cables or pipes and their function is in no way impaired by vibrations in their field of application. Their considerable resistance to the access of water is an additional, technically important advantage.

The optionally soft, flexible intumescent masses obtainable according to the invention have improved flame resistance even without the use of halogen compounds. When exposed to flames, they can foam up to ten times their original volume, forming a fire repellent foam which shields the areas behind it against further access of flames.

They may also be thermoplastically worked in the region of the temperature at which they foam up (i.e. in most cases below that temperature). If the temperature is suitably controlled while they are thermoplastically worked up into shaped products (e.g. by pressure moulding or extrusion), the end products may selectively be foamed or solid. The thermoplastic process may under certain operating conditions also be used for modifying shaped products such as plates of foamed material in order to separate them from or weld them to other materials or also for embossing them or for producing permanent deformations.

It is surprisingly found that usable intumescent masses, i.e. an intumescent material which foams up in the presence of flames with reduced dripping or melting off while burning, can only be obtained if the phosphates of the melamine phosphate type according to the invention are used. If some other phosphate, for example ammonium polyphosphate is used instead of the melamine phosphate, the material obtained melts off and boils without significant formation of intumescent foam when exposed to flames. If only pure melamine is used, the material obtained drips off as it burns and when ethylene diamine phosphate or mixtures thereof with melamine is used, the materials obtained immediately drip off in the flame as a highly fluid substance so that no intumescent foam is formed even though the molten material has in itself a tendency to intumescence in the flame region.

Intumescent materials which have been obtained according to the invention, on the other hand, e.g. using melamine-orthophosphates, are observed to undergo vigorous intumescence when exposed to flames with a reduced tendency to drip in the flame. It is precisely this behavior which is of major importance in determining the possibility of technical application of the intumescent materials.

Production of the new intumescent materials may be carried out either continuously or batch-wise. The materials may also be prepared by first mixing various components optionally containing catalysts and other auxiliary agents or mixing together previously prepared mixtures of some of the components, and then filling the reaction mixture either mechanically or by hand, for example into openings which are to be sealed or into heated or unheated moulds, with or without pressure, the mixture subsequently foaming up and hardening. With suitable technical equipment, the mixture may also be sprayed, brush coated or poured onto the substrates or surfaces which are to be protected. The reaction mixtures according to the invention may also first be made up into semi-finished products such as foams, profiles or coatings which may then be further worked up as required, e.g. by cutting, heat forming, granulating, grinding or mixing, coating and bonding. The materials may also be used in a pulverulent or granulated form as intumescent fillers for filling cavities or as components to be added to coating compounds, putties or plastics.

Composite materials having special intumescent properties may also be obtained by combining the reaction mixtures with either foamed or solid, inorganic or organic aggregates such as, for example, carbon black, graphite, coke, hydrous silicates, perlites, vermiculites, expandable graphites, polystyrene foam, polyurethane foam, phenoplasts, aminoplasts, sand or expanded clay, expanded graphite, urea or phenol resin foams, foam glass, glass fibres, wood, mineral wood, pumice stone, etc. The use of the intumescent masses according to the invention for the manufacture of moulded parts reinforced with fibres, wire, weaves, strands or non-woven webs of organic or inorganic materials or the use of the intumescent masses as components of multilayered or sandwich structures should also be considered as well as the combination of the intumescent materials with other intumescent materials on an organic or inorganic basis.

Suitable fillers, used alone or in combination, include in particular aluminum hydroxides, chalk, kaolin, calcium silicates, glass, carbon black, graphite, coke, hydrated silicates, perlites, vermiculites, expandable graphites and solid or hollow beads of silicaceous material, e.g. so called micro-balloons; in addition to the hollow beads, aluminum hydroxides are preferred due to their capacity for dehydration.

The following components are used for carrying out the process according to the invention.

1. Polyisocyanates include aliphatic, cycloaliphatic, araliphatic, aromatic and heterocyclic poly-isocyanate such as those described, for example, by W. Siefken in Justus Liebigs Annalen der Chemie, 562, pages 75 to 136, for example, those corresponding to the formula $$Q(NCO)_n$$

wherein
  n represents 2-4, preferably 2, and
  Q represents an aliphatic hydrocarbon group having 2-18, preferably 6-10 carbon atoms; a cycloaliphatic hydrocarbon group having 4-15, preferably 5-10 carbon atoms; an aromatic hydrocarbon group having 6-15, preferably 6-13 carbon atoms;

or an araliphatic hydrocarbon group having 8–15, preferably 8–13 carbon atoms.

Examples include ethylene diisocyanate, tetramethylene-1,4-diisocyanate, hexamethylene-1,6-diisocyanate, dodecane-1,12-diisocyanate, cyclobutane-1,3-diisocyanate, cyclohexane-1,3- and -1,4-diisocyanate and any mixtures of these isomers, 1-isocyanato-3,3,5-trimethyl-5-isocyanatomethyl-cyclohexane (German Auslegeschrift No. 1,202,785, U.S. Pat. No. 3,401,190), hexahydrotolylene-2,4- and-2,6-diisocyanate and any mixtures of these isomers, hexahydrophenylene-1,3- and/or -1,4-diisocyanate, perhydrodiphenylmethane-2,4'- and/or -4,4'-diisocyanate, phenylene-1,3- and -1,4-diisocyanate, tolylene-2,4- and -2,6-diisocyanate and any mixtures of these isomers, diphenylmethane-2,4'- and/or -4,4'-diisocyanate (pure MDI), and naphthylene-1,5-diisocyanate.

The following, for example, may also be used according to the invention: triphenylmethane-4,4',4''-triisocyanate, polyphenyl-polymethylene polyisocyanates which may be obtained by aniline-formaldehyde condensation following by phosgenation and have been described, for example, in British Pat. Nos. 874,430 and 848,671, m- and p- isocyanatophenyl sulphonyl isocyanates according to U.S. Pat. No. 3,454,606, perchlorinated aryl polyisocyanates such as those described, for example, in German Auslegeschrift No. 1,157,601 (U.S. Pat. No. 3,277,138), polyisocyanates containing carbodiimide groups as described in German Pat. No. 1,092,007 (U.S. Pat. No. 3,152,162) and in German Offenlegungsschriften Nos. 2,504,400, 2,537,685 and 2,552,350, norbornane diisocyanates according to U.S. Pat. No. 3,492,330, polyisocyanates containing allophanate groups as described e.g. in British Pat. No. 994,890, Belgian Pat. No. 761,626 and Netherlands patent application No. 7,102,524, polyisocyanates containing isocyanurate groups as described e.g. in U.S. Pat. No. 3,001,973, German Pat. Nos. 1,022,789, 1,222,067 and 1,027,394 and in German Offenlegungsschriften Nos. 1,929,034 and 2,004,048, polyisocyanates containing urethane groups as described e.g. in Belgian Pat. No. 752,261 or in U.S. Pat. Nos. 3,394,164 and 3,644,457, polyisocyanates containing acylated urea groups according to German Pat. No. 1,230,778, polyisocyanates containing biuret groups as described e.g. in U.S. Pat. Nos. 3,124,605, 3,201,372 and in British Pat. No. 889,050, polyisocyanates prepared by telomerization reactions as described e.g. in U.S. Pat. No. 3,654,106, polyisocyanates containing ester groups, such as those mentioned, for example, in British Pat. Nos. 965,474 and 1,072,956, U.S. Pat. No. 3,567,763 and German Pat. No. 1,231,688, reaction products of the above mentioned isocyanates with acetals according to German Pat. No. 1,072,385 and polyisocyanates containing polymeric fatty acid esters according to U.S. Pat. No. 3,455,883.

Distillation residues containing isocyanate groups from the commercial production of isocyanates may also used, optionally dissolved in one or more of the above mentioned polyisocyanates. Any mixtures of the above mentioned polyisocyanates may also be used.

As a rule, commercially readily available polyisocyanates are particularly preferred, e.g. tolylene-2,4- and -2,6-diisocyanate and any mixture of these isomers ("TDI"), polyphenyl-polymethylene polyisocyanates such as are obtainable by anilineformaldehyde condensation followed by phosgenation ("crude MDI") and polyisocyanates containing carbodiimide groups, urethane groups, allophanate groups, isocyanurate groups, urea groups or biuret groups ("modified polyisocyanates"), in particular those modified polyisocyanates which are derived from tolylene-2,4- and/or -2,6-diisocyanate or from diphenyl methane-4,4'- and/or 2,4-diisocyanate.

2. Suitable polyethers are those with an average OH number of from about 150 to 500 obtained by the chemical addition of alkylene oxides having an ethylene oxide content of from about 50 to 100%, preferably about 100%, by weight to Zerewitinow active, low molecular weight starters. Polyethers which are more than bifunctional and have OH numbers from about 180 to 400 are particularly preferred.

"More than bifunctional" means, in the context of this invention, that the bifunctional polyethers may be present as mixtures with trifunctional and/or higher functional polyethers. A functionality of from about 2.5 to 4 is preferred.

It is worth noting here that the ethylene oxide in the polyethers may only be replaced to a minor molar extent by other alkylene oxides such as propylene oxide because otherwise the intumescent masses are found to undergo undesirably vigorous afterburning when exposed to fire and the intumescent properties are lost in favor of a tendency to melt off.

Although the polyethers according to the invention are preferably ethylene oxide addition products, it is also possible in principle to replace up to about 50% by weight of the chemically added ethylene oxide by propylene oxide or other alkylene oxides but such replacement is liable to be accompanied by a deterioration in the quality of the intumescent masses so that the addition of polyethers which have been prepared from other alkylene oxides e.g. propylene oxide, in addition to ethylene oxide instead of from ethylene oxide alone, is less preferred.

The use or additional use of starter molecules containing halogen, such as dibromoneopentyl glycol, or epoxides such as epichlorohydrin, may, of course, also be considered for the purpose of this invention but these components are not necessary for obtaining satisfactory fire characteristics. There is, on the whole, an increasing tendency to reject the use of halogen in fire resistant articles.

Preparation of the polyethers is carried out by the methods customarily employed in polyurethane chemistry as known to man of the art.

Suitable low molecular weight starter molecules include those known for the preparation of polyethers, e.g. water, ethylene glycol, propylene glycol, butanediol, trimethylol propane, glycerol, triethanolamine, pentaerythritol, ethylene diamine, tolylene diamine, various sugars and their products of hydrogenation, formoses, and formitols, aniline, polyalkylene polyamines, benzidines and their hydrogenation products, and aniline-formaldehyde condensates and their hydrogenation products. Aliphatic and aromatic polycarboxylic acids may also be used as starters, as may also amino acids and amino alcohols such as ethanolamine.

3. Hydroxyl group-containing polyesters are those with OH numbers of from about 100 to 350, as obtained by the reaction of aliphatic, cycloaliphatic, araliphatic and aromatic polycarboxylic acids having 2–10 carbon atoms with at least two polyols selected from two different groups of the three groups:
  (a) hydroxyl compounds with a molecular weight of up to about 200 having more than 3 OH groups, (b) hydroxyl compounds with a molecular weight of up to about 150 having 3 OH groups, (c) hydroxyl compounds with a molecular weight of up to about 80 having 2 OH groups, one polyol of which should belong to group (a).

The polycarboxylic acids may be selected from those already known. In addition to benzene dicarboxylic acids, aliphatic polycarboxylic acids having 3–10 carbon atoms are preferred.

Examples of benzene dicarboxylic acids include phthalic acid and iso- and terephthalic acid. The aliphatic polycarboxylic acids used are mainly those having 3–8 carbon atoms, such as citric acid, oxalic acid, maleic and fumaric acid, and succinic acid. Adipic acid is preferred on account of its ready availability.

Among the hydroxyl compounds of group (a), pentaerythritol is preferred but others may also be used, e.g. mannitol, sorbitol, xylitol and formitol, i.e. sugar polyols.

Among hydroxyl compounds of group (b), glycerol is preferred but trimethyolol propane and triethanolamine, for example, may also be used.

Among hydroxyl compounds of group (c), ethylene glycol may be mentioned as a preferred example.

The viscosities of the polyesters at 75° C. are in the region of from about 200 to 8000 cP, viscosities of from about 300 to 5000 cP at 75° C. being preferred. The acid numbers should be below about 10 and are preferably from about 0 to 5. The molecular weights are in the region of from about 300 to 4000, preferably from about 500 to 1500, and the OH numbers are from about 100 to 350, preferably from about 200 to 300.

Other polyesters having a different composition may in principle be included but their proportion should not exceed about 20% by weight of the total quantity of polyesters.

4. Suitable phosphates are those of the melamine phosphate type. These are preferably reaction products of 1 mol of melamine with from about 0.01 to 2.5, preferably from about 0.5 to 1.0 mol of orthophosphoric acid but other phosphoric acids, such as meta or pyrophosphoric acid or those in which the phosphorus has a different valency may also be used. Preparation of the phosphate is carried out, for example, by the reaction of melamine with $H_3PO_4$ in aqueous suspension at about 10° to 120° C. with cooling, filtering and drying. Mixtures of melamine with melamine phosphate having a high phosphoric acid content may be used in place of melamine phosphates having a low phosphoric acid content.

Within the general meaning of this invention, however, phosphates are regarded as "phosphates of the melamine phosphate type" if they are found to have a solubility in water of less than about 5% by weight, preferably less than about 1% by weight (in the form of the saturated solution at room temperature) and they are optionally obtained by the addition of phosphoric acids to compounds which may be regarded as cyanuric acid derivatives, e.g. cyanamide, dicyanamide, hydrazodicarbonamide, dicyandiamide, guanidine and salts thereof, biguanide, urazole, urazole cyanurate, melamine cyanurate, cyanuric acid salts, cyanuric acid esters and amides, and in particular melamine, which is preferred on account of its ready availability.

The melamine is preferably the basic compound 2,4,6-triamino-s-triazine although condensation products thereof obtained, for example, by heat treatment of this compound or its reaction with formaldehyde, may also be used.

According to the invention, this definition also covers urea, guanidine, allophanate, biuret, dicyandiamide, polycondensation products thereof and particularly water insoluble formaldehyde condensation products thereof.

This invention also relates to the combination of, for example, red phosphorus in a quantity, for example, stoichiometrically corresponding to the quantity of phosphoric acids, and, for example, melamine since this is immediately converted into phosphoric acids in the combustion process to form the phosphates according to the invention in situ.

5. Other organic compounds containing isocyanate reactive hydrogen atoms include in particular the following:

Phosphorus-containing condensation products having at least two hydroxyl groups, such as the products obtainable, for example, from the condensation of primary or secondary aliphatic, cycloaliphatic, aromatic, araliphatic or heterocyclic mono- and/or polyamines optionally containing OH groups, carbonyl compounds and dialkyl phosphites, optionally followed by alkoxylation. Such condensation products are known and have been disclosed, for example, in DE-PS 1,143,022, U.S. Pat. No. -PS- 3,076,010, DE-AS 1,803,747 and DE-AS 1,928,265.

The phosphorus-containing condensation products with at least two hydroxyl groups which are optionally also used according to the invention are preferably those corresponding to the formula:

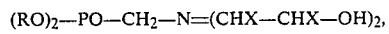

$$(RO)_2-PO-CH_2-N=(CHX-CHX-OH)_2,$$

wherein

R represents $C_1-C_8$ alkyl or $C_1-C_8$ hydroxyalkyl, preferably ethyl or hydroxyethyl, and X represents H or methyl, preferably H.

Compounds containing at least two isocyanate reactive hydrogen atoms and generally having a molecular weight of from 400 to about 10,000 may also be used. These include not only compounds containing amino groups, thiol groups or carboxyl groups but particularly also compounds containing hydroxyl groups, in particular compounds with 2 to 8 hydroxyl groups, especially those with a molecular weight of from about 1,000 to 6,000, preferably from about 1,000 to 3,000, e.g. polyesters containing at least 2, generally 2 to 8, preferably 2 to 4 hydroxyl groups, and polyethers, polythioethers, polyacetals, polycarbonates and polyester amides other than those mentioned under 3. and known per se for the preparation of both homogeneous and cellular polyurethanes.

Suitable polyesters containing hydroxyl groups include, for example, the reaction products of polyhydric, preferably dihydric alcohols with the optional addition of trihydric alcohols and polybasic, preferably dibasic carboxylic acids. Instead of free polycarboxylic acids, the corresponding polycarboxylic acid anhydrides or corresponding polycarboxylic acid esters of lower alcohols or mixtures thereof may be used for the preparation of the polyesters. The polycarboxylic acids may be aliphatic, cycloaliphatic, aromatic and/or heterocyclic and they may be saturated, e.g. by halogen atoms, and/or unsaturated.

The following are mentioned as examples of such carboxylic acids and their derivatives:

Succinic acid, adipic acid, suberic acid, azelaic acid, sebacic acid, phthalic acid, isophthalic acid, trimellitic acid, phthalic acid anhydride, tetrahydrophthalic acid anhydride, hexahydrophthalic acid anhydride, tetrachlorophthalic acid anhydride, endomethylene tetrahydrophthalic acid anhydride, glutaric acid anhydride, maleic acid, maleic acid anhydride, fumaric acid, dimerized and trimerized unsaturated fatty acids optionally mixed with monomeric unsaturated fatty acids such as oleic acid; dimethyl terephthalate and terephthalic acid-bis-glycol esters. Examples of suitable polyhydric alcohols include ethylene glycol, propylene glycol-(1,2) and -(1,3), butylene glycol-(1,4) and -(2,3), hexanediol-(1,6), octane diol-(1,8), neopentylglycol, 1,4-bis-hydroxymethyl cyclohexane, 2-methyl-propanediol-(1,3), glycerol, trimethylol propane, hexanetriol-(1,2,6), butanetriol-(1,2,4), trimethylol ethane, pentaerythritol, quinitol, mannitol and sorbitol, formitol, methyl-glycoside, diethylene glycol, triethylene glycol, tetraethylene glycol and higher polyethylene glycols, dipropylene glycol and higher polypropylene glycols, and dibutylene glycol and higher polybutylene glycols. The polyesters may contain a proportion of carboxyl end groups. Polyesters of lactones such as εcaprolactone, or of hydroxycarboxylic acids such as ω-hydroxy caproic acid, for example, may also be used.

The polyethers which have at least 2, generally 2 to 8, preferably 2 or 3 hydroxyl groups and are other than those mentioned under 3. are also of known type and are prepared, for example, by the polymerization of epoxides such as ethylene oxide, propylene oxide, butylene oxide, tetrahydrofuran, styrene oxide or epichlorohydrin, either on their own, e.g. in the presence of Lewis catalysts such as $BF_3$, or by chemical addition of these epoxides, preferably ethylene oxide and propylene oxide, optionally as mixtures or successively, to starting components containing reactive hydrogen atoms, such as water, alcohol, ammonia or amines. Sucrose polyethers such as those described, for example, in German Auslegeschriften No. 1,176,358 and No. 1,064,938 and polyethers started on formitol or formose (German Offenlegungsschriften Nos. 2,639,083 and 2,737,951) may also be used according to the invention.

Representatives of the above mentioned compounds to be used according to the invention are described, for example, in High Polymers, Vol. XVI, "Polyurethanes Chemistry and Technology" by Saunders Frisch, Interscience Publishers, New York, London, Volume I, 1962, pages 32–42 and 44–54 and Volume II, 1964, pages 5–6 and 198–199 and in Kunststoff Handbuch, Volume VII, Vieweg-Höchtlen, Carl Hanser Verlag, Munich, 1966, e.g. on pages 45–71. Mixtures of the above mentioned compounds containing at least two isocyanate reactive hydrogen atoms and having a molecular weight of 400 - about 10,000, may, of course, also be used, e.g. mixtures of polyethers and polyesters.

Compounds containing at least two isocyanate reactive hydrogen atoms and having a molecular weight of from 32–400 may additionally be used. These also are compounds having hydroxyl groups and/or amino groups and/or thiol groups and/or carboxyl groups, preferably hydroxyl groups and/or amino groups and serve as chain lengthening agents or cross linking agents. These compounds generally have from 2 to 8, preferably 2 to 4 isocyanate reactive hydrogen atoms.

These compounds also may be used as mixtures of compounds having a molecular weight of from 32 to 400 and containing at least two isocyanate reactive hydrogen atoms.

The following are examples of such compounds: ethylene glycol, propylene glycol-(1,2) and -(1,3), butylene glycol-(1,4) and -(2,3), pentanediol-(1,5), hexanediol-(1,6), octanediol-(1,8), neopentylglycol, 1,4-bis-hydroxymethyl-cyclohexane 2-methyl-1,3-propanediol, dibromobutenediol (U.S. Pat. No. 3,723,392), glycerol, trimethylol propane, hexanetriol-(1,2,6), trimethylol ethane, pentaerythritol, quinitol, mannitol and sorbitol, castor oil, diethylene glycol, triethylene glycol, tetraethylene glycol, higher polyethylene glycols with a molecular weight of up to 400, dipropylene glycol, higher polypropylene glycols with a molecular weight of up to 400, dibutylene glycol, higher polybutylene glycols with a molecular weight of up to 400, 4,4'-dihydroxy-diphenyl propane, dihydroxymethyl hydroquinone, ethanolamine, diethanolamine, N-methyl diethanolamine, triethanolamine and 3-aminopropanol.

Suitable low molecular weight polyols for the purpose of this invention also include the mixtures of hydroxy aldehydes and hydroxy ketones ("formose") and the polyhydric alcohols ("formitol") obtained from them by reduction, such as the compounds obtained from the autocondensation of formaldehyde hydrate in the presence of metal compounds as catalysts and compounds capable of enediol formation as co-catalysts (German Offenlegungsschriften Nos. 2,639,084, 2,714,084, 2,714,104, 2,721,186, 2,738,154 and 2,738,512). For producing polymer resins with improved flame resistance, these formoses are advantageously used in combination with aminoplast formers and/or phosphites (German Offenlegungsschriften No. 2,738,513 and 2,738,532). Solutions of polyisocyanate polyaddition products, in particular of polyurethane ureas containing ionic groups and/or polyhydrazodicarbonamides, in low molecular weight polyhydric alcohols may also be used as polyol components according to this invention (German Offenlegungsschrift No. 2,638,759).

Examples of suitable aliphatic diamines for the purpose of this invention include ethylene diamine, tetramethylene-1,4-diamine, undecamethylene-1,11-diamine, dodecamethylene-1,12-diamine and mixtures thereof, 1-amino-3,3,5-trimethyl-5-aminomethyl cyclohexane ("isophorone diamine"), hexahydrotolylene-2,4-and -2,6-diamine and mixtures thereof, perhydro-2,4'-and 4,4'-diaminodiphenyl methane, p-xylylene diamine, bis-(3-aminopropyl)-methylamine, diamino-perhydro anthracenes (German Offenlegungsschrift No. 2,638,731) and cycloaliphatic triamines according to German Offenlegungsschrift No. 2,614,244. Hydrazine and substituted hydrazines, e.g. methylhydrazine, N,N'-dimethyl hydrazine and their homologues and acid dihydrazides may also be used according to the invention, e.g. carbodihydrazide, oxalic acid dihydrazide, the dihydrazides of malonic acid, succinic acid, glutaric acid, adipic acid, β-methyladipic acid, sebacic acid, hydracrylic acid and terephthalic acid; also semicarbazido-alkylene hydrazides such as, for example, β-semicarbazido-propionic acid hydrazide (German Offenlegungsschrift No. 1,770,591), semicarbazido alkylene carbazic esters such as 2-semi-carbazidoethyl carbazic ester (German Offenlegungsschrift No. 1,918,504) or also amino semicarbazide compounds such as -aminoethyl- semicarbazido-carbonate (German Offenlegungsschrift No. 1,902,931). The amino groups may also be partly or completely blocked by aldimine or ketimine groups to control their reactivity (U.S. Pat. No. 3,734,894; German Offenlegungsschrift No. 2,637,115).

Examples of aromatic diamines include bis-anthranilic esters according to German Offenlegungsschriften Nos. 2,040,644 and 2,160,590, 3,5- and 2,4-diaminobenzoic acid esters according to German Offenlegungsschrift No. 2,025,900, the diamines containing ester groups described in German Offenlegungsschriften Nos. 1,803,635 (U.S. Pat. Nos. 3,681,290 and 3,736,350), 2,040,650 and 2,160,589, the diamines containing ether groups according to German Offenlegungsschriften Nos. 1,770,525 and 1,809,172 (U.S. Pat. Nos. 3,654,364 and 3,736,295), 2-halogen-1,3-phenylene diamines optionally substituted in the 5-position (German Offenlegungsschriften Nos. 2,001,772, 2,025,896 and 2,065,869), 3,3'-dichloro-4,4'-diaminodiphenyl methane, tolylene diamine and 4,4'-diaminodiphenyl methane.

Although inclusion of the last mentioned reactants (6) may be considered, it would be necessary in the individual case to consider the possible disadvantageous effects on the fire characteristics.

It has been found that the advantageous properties of the new intumescent masses and particularly the intumescent foams are not determined by the usual stoichiometric proportions of conventional polyurethane chemistry. Indeed, components 2,3,4 and optionally 5 and 6 are added together regardless of the stoichiometric proportions which would be required in isocyanate chemistry, and the resulting mixture is reacted in simple preliminary experiments with various quantities of the polyisocyanate within a range determined according to the invention, in order to discover the desired optimum activity empirically.

The suitable quantitative properties thereby discovered for the individual components 2,3 and 4 and, optionally 5 and 6 in the reaction mixtures which is to be reacted with the polyisocyanates add up to 100% and are as follows:

For the polyhydroxyl compounds (2,3): about 20 to 80, preferably about 40 to 70%, For the phosphates (4): about 15 to 75, preferably about 20 to 50% by weight, For water (5): 0 to 10, preferably 0 to 1.5% by weight, For the other organic compound containing isocyanate reactive H atoms (6): 0 to 35, preferably 0 to 20% by weight.

100 parts by weight of this reaction mixture are generally reacted with 10 to 70, preferably 15 to 60 and most preferably 20–50 parts by weight of the polyisocyanate.

Preparation of the intumescent masses may be carried out in a solvent but is preferably carried out solvent free. Foams are of particular interest and may have unit weights of about 40 to 900 kg/m$^3$, preferably from about 80 to 600 kg/m$^3$ constitute a particularly carefully balanced combination of low unit weight, which is desirable for reasons of insulating capacity, and mass per unit volume, which is necessary for the material to foam up in the presence of flames.

The various components of the reaction mixture may be brought together individually although it is preferable to prepare a preliminary mixture of components 2,3 and 4, which are reactive with the polyisocyanates (component 1), and optionally also 5 and/or 6, so that a reaction component containing all the necessary constituents except the polyisocyanate is obtained in liquid form, if necessary after brief heating. The intumescent masses according to the invention may thus be formulated as a two component mixture or prepared from such a mixture. The usual apparatus of polyurethane technology may be used for this purpose.

Further ingredients may also be added to the preliminary mixture of components or also to the isocyanate, e.g. urea, urea condensates, formaldehyde condensates, phenol resins, phosphates, amino polyphosphates, phosphoric acid esters (such as tricresyl phosphate or dibutyl cresyl phosphate), aluminum hydroxides, powdered glass, vermiculite, solid or hollow glass beads or other silicate beads, and other additives which modify the fire characteristics.

This invention also allows the direct combination of phosphoric acids, e.g. orthophosphoric acid, and melamine in the reaction mixture, that is to say the melamine phosphate need not necessarily be previously prepared but may be formed in situ in the reaction mixture. In that case, the simultaneous presence of phosphoric acid and melamine in the reaction product ensures the excellent fire characteristics of the material on exposure to flames without the need of previously carrying out a separate synthesis of the reaction product of the two components.

Although it is surprisingly not necessary for the production of the optionally foamed intumescent masses according to the invention to use catalysts for foam formation or other auxiliary agents customarily used in foam chemistry such as, for example, additional gaseous or low boiling blowing agents or substances which liberate a gas functioning as blowing agent, such additional auxiliary agents may, of course, be considered for use as components of the formulation in individual cases, as may also other auxiliary agents, such as emulsifying, foam stabilizing, mould releasing or colorizing additives, preservatives, agents which protect against hydrolysis, odorizers and other additives. For example, the addition of catalysts known to give rise to carbodiimide formation, such as, for example, 1-methyl-1-oxo-phospholine from the class of phospholine oxides, results in intumescent masses which have improved resistance to hydrolysis.

It should also be considered to include in the formulations for the intumescent masses according to the invention, additives which are capable of increasing foam formation on exposure to fire. Such additives include, for example, aliphatic and in particular aromatic hydroxycarboxylic acids (such as salicylic acid or p-hydroxybenzoic acid), PVC, carbohydrates, substances which release gases such as nitrogen or $CO_2$ or water at elevated temperatures (such as triazoles, azodicarbonamides, sulphohydrazides or urea-dicarboxylic acid anhydride) nitroso compounds, compounds which incorporate water, nitric acid, carbonic acid, paraffins in graphite, urea or zeolites.

Moulded articles or linings or coverings which foam up at temperatures of about 200° C. to 350° C. to prevent the spread of flames and are therefore suitable for use as sealing elements, safety devices and fire barriers may be produced from the intumescent masses according to the invention, for example by incorporating them in or applying them to textiles of organic or inorganic fibres and by spraying, moulding or mould casting and gelling and cutting or melting. The masses may be used for pointing and for closing cable openings and wall openings, for which purpose it is also possible, for example, to produce a sort of concrete from the intumescent substance and stones and/or expanded particles such as expanded clay, expanded glass, vermiculite, perlite and the like and/or foam beads, for example based on polystyrene.

The manufacture of fire resistant upholstery coverings, linings and textile coatings and backings using the new flexible intumescent masses is also of interest.

Another interesting application is the formation of optionally reinforced coatings in virtually any thickness on metal, e.g. steel girders and plates, or on wood, e.g. door panels or roof beams, or on masonry or plastics material including cable insulations or foam panels. Fire retarding panels or wall elements may easily be produced by applying the coatings to a weight carrying panel or supporting construction, e.g. in or onto a wrought metal plate or a honeycomb plate of metal, cardboard, paper, wood, ceramics or plastics.

The intumescent masses may also be used for the manufacture of anti-noise linings or sound proofing elements and for the purposes of energy absorption.

The application of an internal coating to fire retardant doors, which coating foams up in the event of fire and provides an insulating effect, should also be considered, and also the manufacture of door seals and other seals which foam up in the event of fire to seal off the adjacent slot. Sealing sections, e.g. of elastic material, may also be filled or back filled with the intumescent masses according to the invention to produce a fire resistant seal. By suitable arrangement of the intumescent masses it is possible to build up barriers in chimneys, ventilation and air conditioning plants, pipes and inlets and outlet openings to retard or prevent any further access or gases in the event of the structures becoming heated to temperatures of about 300° C. to 400° C. Such arrangements may consist, for example, of stacks of parallel plates placed at small distances apart, sieves or perforated shutters coated with the intumescent masses, pipe sections or pipes loosely filled with granulates of the intumescent masses, and internal coatings consisting of the intumescent masses according to the invention. The optionally foamed intumescent masses may also be used as gas filtering elements which become sealed in the event of excessive rise of temperature.

Filling hollow sections of metal, wood or plastics with the intumescent masses improves their resistance in the event of fire.

Moulded articles, for example, which may easily be formed from the intumescent masses, or also granulates of various grain sizes may be foamed up in one or more stages by heating them to temperatures above about 200° C., preferably to temperatures from about 250°–1000° C., in particular about 300°–800° C. Foaming may be carried out in an unrestricted space or in closed or open moulds which should preferably have openings for the exit of vapour and air. Fire retardant foams, so called carbonizing foams are thereby obtained.

This heating may be carried out by means of radiant heat, by treatment with superheated steam or hot air or other hot gases, by microwave heating or high frequency heating or by thermal conduction in air or liquid baths or metal baths.

The intumescent masses according to the invention may also be applied to support materials and foamed up thereon, e.g. by coating expanded clay particles with the masses and then pouring the particles into a mould and heating them to form a block of expanded clay embedded in carbonizing foam. A suitably coated plate of wood or iron may be worked up into a foam combination plate at about 250° C., and the foam surface may be covered by an additional plate of wood or iron.

The filling up of cavities by foaming should also be mentioned, e.g. in cable shafts but also in bricks and other building materials, for example by introducing the reaction mixtures or the finished foamed intumescent masses in suitable quantities into the cavity of the either cold or still hot brick or other material.

The intumescent masses according to the invention may also be used as pipe half shells or full coverings for insulating pipes or cables. It is a matter of interest that the insulation may also be carried out in situ by coating the pipe or other part to be insulated with the reaction mixture and optionally foaming up the mixture.

Preparation and working up of the reaction mixtures resulting in the intumescent masses may be carried out continuously or batch-wise. The components may be brought together individually or as mixtures. Preferably, all the components of the reaction mixture with the exclusion of the isocyanate are added together so that the reaction mixture may be worked up by a two component process, e.g. in stirrer vessels using ordinary manual stirrers or mechanical stirrers or in mixing heads using mechanical stirrers, nozzles or spray mixers or in static mixers of the type also known in polyurethane chemistry. The reaction of the mixture may be completed with or without pressure in moulds which may be cooled or cold or heated (to temperatures from 25° to about 100° C.).

The following examples serve to explain the subject of the invention by way of example without limiting it. The parts given are parts by weight and/or percentages by weight unless otherwise indicated.

EXAMPLES

The following series of tests serve to illustrate by way of example the relationship between formulation and properties of the intumescent masses obtainable according to the invention.

The following starting materials are used:

As polyisocyanate (1), a commercial, technical polyisocyanate isomer mixture obtained by phosgenation of an aniline-formaldehyde condensate and containing about 80% of dinuclear diisocyanates and about 20% of multi-nuclear polyisocyanates (NCO content about 31% by weight).

The following are used as polyether (2):

2a: Addition product of ethylene oxide and glycerol, OH number 254

2b: Addition product of ethylene oxide and glycerol, OH number 200

2c: Addition product of ethylene oxide and trimethylol propane, OH number 150

2d: Addition product of ethylene oxide and ethylene glycol, OH number 172

2e: Product of addition of a mixture of 40% by weight of propylene oxide and 60% by weight of ethylene oxide to o-tolamine, OH number 430

2f: Product of addition of propylene oxide and ethylene oxide (1:1) to glycerol, OH number 255

2g: Product of addition of 40% by weight of propylene oxide and 60% by weight of ethylene oxide to a mixture of equal parts by weight of glycerol and propylene glycol, OH number 260

2h: Product of addition of ethylene oxide to triethanolamine, OH number 230.

The substance used as polyester (3) is a polyester of about 6 mol of adipic acid, about 1 mol of pentaerythritol, about 0.25 mol of neopentyl glycol, 0.25 mol of glycerol and about 5.00 mol of ethylene glycol, having an OH number of 256, an acid number of 3.1 and a viscosity at 75° C. of 388 cP.

The phosphate of melamine phosphate type (4) is a reaction product of melamine (1 mol) with 1 mol of $H_3PO_4$ in phosphate 4a and 0.5 mol of $H_3PO_4$ in 4b.

The formulations of Examples 1 to 12 are summarized in Table 1.

Preparation of the intumescent masses was carried out by vigorously mixing the components, isocyanate, polyol and phosphate, at room temperature, using a kneader or stirrer. A dough was obtained, which was immediately forced into a U-shaped profile mould of silicone rubber having a cross-section of 1 cm² and a length of 1 m. This mould was tempered overnight in a circulating air cupboard at 50° C. and the profile member, consisting of the intumescent mass according to the invention, was removed from the mould.

The materials obtained were tough and flexible and the profiles may, for example, be wedged into sealing joints and cracks, thereby sealing them off in a fire-resistant and insulating manner. The less flexible materials from Example 1 may be poured as intumescent masses into any cavities which are at risk.

To assess the intumescent and fire characteristics, which are also entered in the Table, the sections were cut into rectangular blocks 1 cm in length which were introduced into an oven preheated to 300° C. The material was removed after 1 hour and the increase in volume of the material, which had in most cases foamed up into a cauliflower formation, was assessed. Expansion with formation of a carbonizing foam was observed in all cases.

A rectangular block of the experimental sample having a length of edge of 0.5 cm, was also produced, placed on a wire sieve and exposed from above to the non-luminous flame of a natural gas Bunsen burner. The flame was extinguished after 3 minutes and the expansion assessed.

To assess afterburning, the intumescent profile 1 cm² in cross section was exposed from below to the non-luminous flame of the Bunsen burner. The flame was briefly removed after 30 seconds and 60 seconds and any afterburning was assessed as follows:

| Immediate extinction | = | (−) |
| Burning less than 5 seconds | = | (−+) |
| Burning less than 10 seconds | = | (+−) |
| Burning over 10 seconds | = | (+) |

TABLE 1

| | Example No. | | | | | | | | | | | | |
|---|---|---|---|---|---|---|---|---|---|---|---|---|---|
| | 1 | 2 | 3 | 4 | 5 | 6 | 7 | 8 | 9 | 10 | 11 | 12 | 13 |
| Components (parts by weight) | | | | | | | | | | | | | |
| *Isocyanate* | | | | | | | | | | | | | |
| Type 1 | 10 | 20 | 25 | 35 | 50 | 50 | 20 | 28 | 20 | 23 | 25 | 24 | 25 |
| *Polyol* | | | | | | | | | | | | | |
| Type 2a | 25 | 35 | 50 | 65 | 80 | | 50 | | | | | | 50 |
| Type 2b | | | | | | | | 35 | | | | | |
| Type 2c | | | | | | | | | 25 | | | | |
| Type 2d | | | | | | | | | | 50 | | | |
| Type 2e | | | | | | | | | | | 20 | | |
| Type 2f | | | | | | | | | | | 20 | | |
| Type 2g | | | | | | | | | | | | 25 | |
| Type 2h | | | | | | | | | | | | 25 | |
| 3 | | | | | | 80 | | 20 | 25 | | 10 | | |
| *Phosphate* | | | | | | | | | | | | | |
| Type 4a | 40 | 25 | 50 | 35 | 20 | 25 | 30 | 30 | | 15 | 35 | 30 | |
| Type 4b | 35 | 40 | | | | 25 | | | 30 | 15 | | | 25 |
| Melamine | | | | | | | | | | | | | 25 |
| Intumescence % | | | | | | | | | | | | | |
| 300° C. | 50 | 150 | 150 | 200 | 250 | 50 | 300 | 200 | 300 | 250 | 200 | 200 | 300 |
| Exposure to flame | 200 | 300 | 300 | 200 | 100 | 200 | 300 | 300 | 300 | 300 | 200 | 300 | 300 |
| Afterburning | − | − | + | + | + | − | + | + | − | + | + | + | + |

EXAMPLE 14

95 parts of polyol 2a and 5 parts of polyol 3 were mixed with 28 parts of a commercial P-ester (water content about 0.2%) having the idealized formula $(C_2H_5O)_2POCH_2N(C_2H_4OH)_2$ and 1.7 parts of iron oxide red pigment, 13 parts of aluminum hydroxide and 48 parts of a reaction product of 1 mol of melamine and 0.5 mol of $H_3PO_4$ to form a homogeneous, highly fluid paste. 92 parts of a commercially available technical mixture of polyisocyanate isomers containing about 65% of dinuclear diisocyanates (Desmodur 44 V 40 of Bayer AG) obtainable by the phosgenation of aniline formaldehyde condensates were vigorously stirred into this mixture at room temperature.

After 10 seconds stirring, the mixture was poured into the profile mould used above. An intumescent profile was removed after about 10 minutes at room temperature from the mould which had been treated with mould release agents. The unit weight was about 0.3g/cm³.

Both in the test for intumescence and in the flame test, the product was found to foam up to over 200 volume percent. No afterburning took place. The material had a Shore A hardness of 45.

A sample of material showed the same advantageous intumescent behavior after 30 days storage under water followed by drying.

Neither in the flame test nor in the test for afterburning was there any sign of formation of a melt dripping from the material such as would occur if melamine or ammonium polyphosphate had been used instead of melamine phosphate.

EXAMPLE 15

100 parts of polyol 2a were stirred together with 35 parts of melamine. 17 parts of 85% $H_3PO_4$ were then added and the mixture was stirred for 5 minutes. 60 parts of the P-ester from Example 14, 2 parts of titanium dioxide white pigment and 15 parts of aluminum hydroxide were then added. A homogeneous, fluid, easily stirrable mixture was obtained, which was then stirred up with 100 parts of the polyisocyanate used in Example 14, using an open stirrer vessel with laboratory stirrer.

The substance was then further worked up as in Example 14 and tested. The intumescent profile obtained had a unit weight of about 0.14 $g/cm^3$ and had a tough, plastic consistency with a low recovery speed when the foam structure was deformed at 20° C. In the flame test, the material was found to foam up to over 500 volumes percent and no dripping melt was formed. The material is eminently suitable for pressing into joints, where it provides protection against fire.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. An optionally foamed intumescent mass obtained by reacting about 10 to 70 parts of (1) with 100 parts of a mixture comprising about 20 to 50 parts of (4) and a total of about 20 to 80 parts of either or both of (2) and (3) wherein
   (1) is a polyisocyanate,
   (2) is a polyether having an average OH number of from about 150 to 500 obtained by the chemical addition of alkylene oxides having an ethylene oxide content of from about 50 to 100% by weight to low molecular weight starters,
   (3) is a hydroxyl group-containing polyester with an OH number of from about 100 to 350 obtained by the reaction of aliphatic, cycloaliphatic, araliphatic and aromatic polycarboxylic acids having 2 to 10 carbon atoms with at least two polyols selected from two different groups of the three following groups:
   (a) hydroxyl compounds with a molecular weight of up to about 200 having more than three OH groups,
   (b) hydroxyl compounds with a molecular weight of up to about 150 having three OH groups,
   (c) hydroxyl compounds with a molecular weight of up to about 80 and having two OH groups, wherein one of which polyol belongs to group (a), and
   (4) is a phosphate of the melamine phosphate type.

2. The intumescent mass of claim 1 wherein said polyisocyanate is a polyphenylene polymethyl polyisocyanate obtained by the phosgenation of anilineformaldehyde condensation products.

3. The intumescent mass of claim 1 wherein said phosphates are melamine phosphates obtained from about 0.2 to 1 mol of orthophosphoric acid per mol of melamine.

4. The intumescent mass of claim 2 wherein said phosphates are melamine phosphates obtained from about 0.2 to 1 mol of orthophosphoric acid per mol of melamine.

5. The intumescent mass of claim 1 wherein said alkylene oxides have an ethylene oxide content of about 100% by weight.

6. The intumescent mass of claim 2 wherein said alkylene oxides have an ethylene oxide content of about 100% by weight.

7. The intumescent mass of claim 3 wherein said alkylene oxides have an ethylene oxide content of about 100% by weight.

8. The intumescent mass of claim 4 wherein said alkylene oxides have an ethylene oxide content of about 100% by weight.

9. The intumescent mass of claim 1 wherein said mixture additionally contains water and/or other compounds containing isocyanate-reactive hydrogen atoms.

10. The intumescent mass of claim 1 wherein said mixture additionally contains a phosphorus-containing condensation product having at least 2 hydroxyl groups and obtained by the condensation of a primary or secondary mono- and/or polyamine, a carbonyl compound and a dialkyl phosphite, optionally followed by alkoxylation.

11. The intumescent mass of claim 10 wherein said primary or secondary mono- and/or polyamine contains OH groups.

12. Moulded articles or devices for preventive fire protection produced from the intumescent mass of claim 1.

* * * * *